United States Patent
Zeng et al.

(10) Patent No.: US 12,287,886 B2
(45) Date of Patent: Apr. 29, 2025

(54) METHOD FOR FILE ENCRYPTION, TERMINAL, ELECTRONIC DEVICE AND COMPUTER-READABLE STORAGE MEDIUM

(71) Applicant: SHENZHEN PAX SMART NEW TECHNOLOGY CO., LTD., Guangdong (CN)

(72) Inventors: Lingcong Zeng, Guangdong (CN); Aiping Zhou, Guangdong (CN); Qiong Huang, Guangdong (CN)

(73) Assignee: SHENZHEN PAX SMART NEW TECHNOLOGY CO., LTD., Guangdong (CN)

( * ) Notice: Subject to any disclaimer, the term of this patent is extended or adjusted under 35 U.S.C. 154(b) by 188 days.

(21) Appl. No.: 18/023,100

(22) PCT Filed: Jul. 14, 2021

(86) PCT No.: PCT/CN2021/106159
§ 371 (c)(1),
(2) Date: Feb. 24, 2023

(87) PCT Pub. No.: WO2022/048315
PCT Pub. Date: Mar. 10, 2022

(65) Prior Publication Data
US 2023/0325516 A1    Oct. 12, 2023

(30) Foreign Application Priority Data
Sep. 3, 2020    (CN) .......................... 202010917874.9

(51) Int. Cl.
G06F 21/60    (2013.01)
H04L 9/14    (2006.01)

(52) U.S. Cl.
CPC .............. *G06F 21/602* (2013.01); *H04L 9/14* (2013.01); *G06F 2221/2107* (2013.01)

(58) Field of Classification Search
CPC ........... G06F 21/602; G06F 2221/2107; G06F 21/62; G06F 21/6209; G06F 21/6218; G06F 21/6227; H04L 9/14; H04L 63/0428
See application file for complete search history.

(56) References Cited

U.S. PATENT DOCUMENTS

2004/0091114 A1* 5/2004 Carter .................. G06F 21/606
380/259
2012/0250859 A1    10/2012 Wu et al.
(Continued)

FOREIGN PATENT DOCUMENTS

CN    101000648 A    7/2007
CN    101008974 A    8/2007
(Continued)

*Primary Examiner* — Malcolm Cribbs
(74) *Attorney, Agent, or Firm* — Brooks Kushman P.C.

(57) ABSTRACT

A method for file encryption includes: determining, in response to obtaining a file to be encrypted, a first secret key for encrypting a file name according to the file name of the file to be encrypted; encrypting the file name according to the first secret key to obtain file name encryption information; and sending the file to be encrypted and the file name encryption information to a local service layer, in order that the local service layer encrypts a file content of the file to be encrypted based on the file to be encrypted and the file name encryption information. The encryption operation of the file content is mainly performed in the local service layer, so that the security protection of the encrypted file may be guaranteed.

4 Claims, 3 Drawing Sheets

(56) References Cited

U.S. PATENT DOCUMENTS

| | | | | |
|---|---|---|---|---|
| 2014/0258719 A1* | 9/2014 | Cidon | ............... | G06F 21/6209 |
| | | | | 713/165 |
| 2016/0078245 A1* | 3/2016 | Amarendran | .......... | G06N 20/00 |
| | | | | 713/193 |
| 2017/0053125 A1* | 2/2017 | Savagaonkar | .......... | G06F 21/60 |
| 2017/0249472 A1* | 8/2017 | Levy | ................. | G06F 21/6245 |

FOREIGN PATENT DOCUMENTS

| | | | |
|---|---|---|---|
| CN | 104038828 A | 9/2014 |
| CN | 104134046 A | 11/2014 |
| CN | 105447398 A | 3/2016 |
| CN | 105515762 A | 4/2016 |
| CN | 105590064 A | 5/2016 |
| CN | 107087004 A | 8/2017 |
| CN | 109245891 A | 1/2019 |
| CN | 110263556 A | 9/2019 |
| CN | 110414249 A | 11/2019 |
| CN | 110535868 A | 12/2019 |
| CN | 111343001 A | 6/2020 |
| CN | 111385258 A | 7/2020 |
| CN | 112035860 A | 12/2020 |

\* cited by examiner

METHOD FOR FILE ENCRYPTION, TERMINAL, ELECTRONIC DEVICE AND COMPUTER-READABLE STORAGE MEDIUM

CROSS-REFERENCE TO RELATED APPLICATIONS

This application is a 35 U.S.C. § 371 national stage application of PCT patent application No. PCT/CN2021/106159, filed on Jul. 14, 2021, which claims priority to Chinese patent application No. 202010917874.9, filed on Sep. 3, 2020. The entire contents of which are incorporated herein by reference.

FIELD

The present application relates to the technical field of computers, and more particularly, to a method for file encryption, a terminal for file encryption, an electronic device and a computer-readable storage medium.

BACKGROUND

In an application program (Application Program, APP), if file data is directly stored in a form of plaintext, the file data is prone to be attacked by a malicious user, such that the file data is stolen and used for some illegal purposes.

Therefore, in the related art, the file data of the APP needs to be encrypted, such that the security of the file data can be protected.

SUMMARY

A method for file encryption, a terminal device for file encryption, and a computer-readable storage medium are provided in the embodiments of the present application, which aim to solve a problem in the related art that the safety of file data is not high.

In the first aspect, a method for file encryption performed by an electronic device is provided, the method includes:
  determining, in response to obtaining a file to be encrypted, a first secret key for encrypting a file name of the file to be encrypted according to the file name of the file to be encrypted;
  encrypting the file name according to the first secret key to obtain file name encryption information; and
  sending the file to be encrypted and the file name encryption information to a local service layer, in order that the local service layer encrypts a file content of the file to be encrypted based on the file to be encrypted and the file name encryption information.

Furthermore, said determining the first secret key for encrypting the file name of the file to be encrypted according to the file name of the file to be encrypted includes:
  generating key acquisition information and identity verification information according to the file name of the file to be encrypted; and
  obtaining a secret key matching with the key acquisition information from a set of keys of an operating system according to the key acquisition information and the identity verification information, and determining the key matching with the key acquisition information as the first secret key.

Furthermore, the method further includes:
generating a pair of RSA keys, using a public key of the pair of RSA keys to encrypt the key acquisition information, associating the encrypted key acquisition information with the identity verification information, and storing the encrypted key acquisition information and the identity verification information associated with the encrypted key acquisition information, associating the file name with the encrypted key acquisition information, and storing the file name and the encrypted key acquisition information associated with the file name.

In the second aspect, a terminal for file encryption is provided in one embodiment of the present application, the terminal includes an application layer and a local service layer;
  the application layer is configured to: determine, in response to obtaining a file to be encrypted, a first secret key for encrypting a file name of the file to be encrypted according to the file name of the file to be encrypted; encrypt the file name according to the first secret key to obtain file name encryption information; and send the file to be encrypted and the file name encryption information to the local service layer,
  the local service layer is configured to encrypt a file content of the file to be encrypted based on the file to be encrypted and the file name encryption information.

Furthermore, the local service layer is further configured to send the encrypted file to the application layer; the encrypted file includes the file name and an encrypted file content;
  the application layer is further configured to obtain, in response to receiving a file reading request including the file name, the first secret key according to the file name included in the file reading request; encrypt the file name according to the first secret key to obtain the file name encryption information; and send the encrypted file and the file name encryption information to the local service layer;
  the local service layer is further configured to decrypt the encrypted file content according to the file name encryption information to obtain a decrypted file content of an decrypted file, and send the decrypted file to the application layer; wherein the decrypted file includes the file name and the decrypted file content;
  the application layer is further configured to output the decrypted file.

Furthermore, the local service layer is further configured to:
  generate a second secret key for encrypting the file content according to a preset key generation step and the file name encryption information; and
  encrypt the file content according to a preset encryption step and the second secret key.

Furthermore, the local service layer is further configured to:
  generate the second secret key according to the preset key generation step and the file name encryption information; and
  decrypt the file content according to a preset decryption step and the second secret key.

Furthermore, the application layer is further configured to:
  generate key acquisition information and identity verification information according to the file name of the file to be encrypted; and
  obtain a secret key matching with the key acquisition information from a set of keys of an operating system according to the key acquisition information and the identity verification information, and determining the key matching with the key acquisition information as the first secret key.

Furthermore, the application layer is further configured to generate a pair of RSA keys, use a public key of the pair of RSA keys to encrypt the key acquisition information, associate the encrypted key acquisition information with the identity verification information, and store the encrypted key acquisition information and the identity verification information associated with the encrypted key acquisition information, associate the file name with the encrypted key acquisition information, and store the file name and the encrypted key acquisition information associated with the file name.

In the third aspect, an electronic device is provided in one embodiment of the present application. The electronic device includes a memory, a processor, and a computer program stored in the memory and executable by the processor. When executing the computer program, the processor is configured to implement the steps of the aforesaid method for file encryption.

In the fourth aspect, a non-transitory computer-readable storage medium is provided in one embodiment of the present application. The computer-readable storage medium stores a computer program, that, when executed by a processor of an electronic device, causes the processor of the electronic device to implement the steps of the aforesaid method for file encryption.

In the fifth aspect, a computer program product is provided in one embodiment of the present application, when the computer program product is executed on an electronic device, the electronic device is caused to perform the method for file encryption as described in the first aspect.

Compared with the related art, the embodiments of the present application have the following beneficial effects: the local service layer has high security and is not prone to be decompiled and cracked. Furthermore, the file to be encrypted is encrypted by using the application layer and the local service layer, and the encryption operation of the file content is mainly performed on the local service layer, so that the security of the encrypted file can be guaranteed. Additionally, since the universality of the codes in the local service layer is relatively higher, so that the method may be applied to environments of different operating systems. Thus, as compared to compiling a set of codes suitable for file encryption for each of the operating systems, the local service layer is adopted to encrypt the file, so that the research and development cost can be saved.

It can be understood that, regarding the beneficial effects of the second aspect, the third aspect, the fourth aspect and the fifth aspect, reference can be made to the relevant descriptions in the first aspect. The beneficial effects of the second aspect, the third aspect, the fourth aspect and the fifth aspect are not repeatedly described herein.

BRIEF DESCRIPTION OF THE DRAWINGS

In order to describe the technical solutions in the embodiments of the present application more clearly, a brief introduction regarding the accompanying drawings that need to be used for describing the embodiments or relevant technology is given below. It is obvious that, the accompanying drawings described below are only some embodiments of the present application. A person of ordinary skill in the art may also obtain other drawings according to the current drawings without paying creative labor.

DETAILED DESCRIPTION OF EMBODIMENTS

Figure 1:
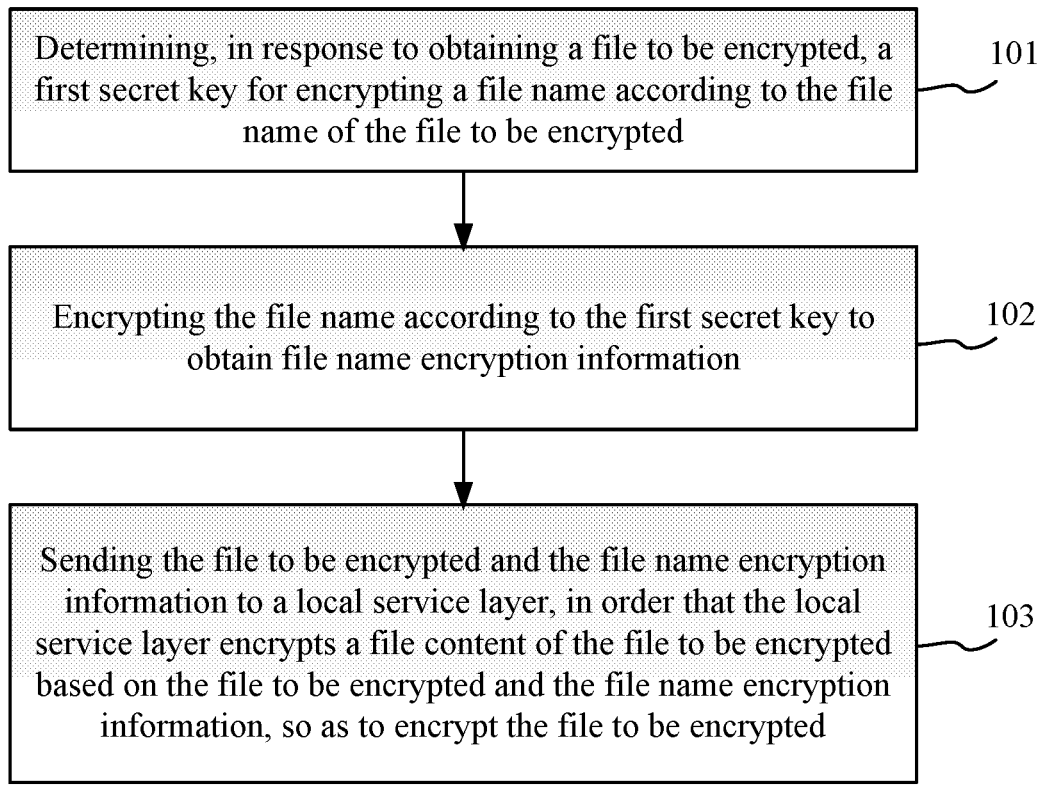
FIG. 1 illustrates a schematic flowchart of a method for file encryption provided by one embodiment of the present application.

In the following descriptions, in order to describe but not intended to limit the present application, concrete details including specific system structure and technique are proposed to facilitate a comprehensive understanding of the embodiments of the present application. However, a person of ordinarily skill in the art should understand that, the present application can also be implemented in some other embodiments from which these concrete details are excluded. In other conditions, detailed explanations of method, circuit, device and system well known to the public are omitted, such that unnecessary details which are disadvantageous to understanding of the description of the present application can be avoided.

It should be understood that, when a term "comprise/include" is used in the description and annexed claims, the term "comprise/include" indicates existence of the described characteristics, integer, steps, operations, elements and/or components, but not exclude existence or adding of one or more other characteristics, integer, steps, operations, elements, components and/or combination thereof.

It should be further understood that, terms "and/or" used in the description and the annexed claims of the present application are referred to as any combination of one or a plurality of listed item(s) associated with each other and all possible items, and including the combinations thereof.

As is used in the description and the annexed claims, a term "if" may be interpreted as "when" or "once" or "in response to determination" or "in response to detection". Similarly, terms such as "if it is determined that", or "if a described condition or event is detected" may be interpreted as "once it is determined" or "in response to the determination" or "once the described condition or event is detected" or "in response to the detection of the described condition or event".

In addition, in the descriptions of the present application, terms such as "first" and "second", "third", etc., are only used for distinguishing purpose in description, but shouldn't be interpreted as indication or implication of a relative importance.

The descriptions of "referring to one embodiment" or "referring to some embodiments", or the like as described in the specification of the present application means that a specific feature, structure, or characters which are described with reference to this embodiment are included in one embodiment or some embodiments of the present application. Thus, the sentences of "in one embodiment", "in some embodiments", "in some other embodiments", "in other embodiments", and the like in this specification are not necessarily referring to the same embodiment, but instead indicate "one or more embodiments instead of all embodiments", unless otherwise they are specially emphasize in other manner. The terms "comprising", "including", "having" and their variations mean "including but is not limited to", unless otherwise they are specially emphasized in other manner.

In order to describe the technical solutions of the present application, the technical solutions are described with reference to the following embodiments.

Embodiment One

Referring to FIG. 1, a method for file encryption is provided in one embodiment of the present application, the method is applied to an application layer (i.e., Java layer), and including:

At step 101, a first secret key for encrypting a file name is determined according to a file name of the file to be encrypted in response to obtaining a file to be encrypted.

The file to be encrypted may be various files. As one example, the file to be encrypted may be a file sent by a server in communication connection, such as a digital certificate file. As another example, the file to be encrypted may also be a file generated by an application program. As yet another example, the file to be encrypted may also be a file which is generated by an application program and includes sensitive data. For example, the sensitive data may be a universal unique identifier (Universal Unique Identifier, UUID) of the application program.

It should be noted that the file to be encrypted generally includes a file name and a file content. The file name usually refers to the name of the file, and the file content generally refers to the content of the file.

In this embodiment, the executive subject of the method for file encryption may be a terminal device. The terminal device may be a variety of electronic devices including, but not limited to, a smart phone, a tablet computer, a laptop portable computer, a desktop computer, and the like.

In this embodiment, the executive subject may obtain the file to be encrypted sent by a device communicated with the executive subject through the network. The executive subject may also directly obtain the file to be encrypted generated by itself.

After obtaining the file to be encrypted, the executive subject may use the file name of the file to be encrypted to determine a secret key for encrypting the file name. Herein, for the convenience of description, a secret key for encrypting a file name is recorded as a first secret key. As an example, the executive subject may obtain the first secret key according to the method as follows: using a hash function to perform hash calculation on the file name to obtain a hash value corresponding to the file name, and looking over a secret key corresponding to the obtained hash value from a pre-stored hash value-key correspondence table and taking the secret key as the first secret key. Herein, the hash value-key correspondence table may be a pre-established correspondence table which stores a correspondence relationship between a plurality of hash values and secret keys.

In some optional implementations of this embodiment, the executive subject may obtain the first secret key in the following manner:

First, key acquisition information and identity verification information are generated according to the file name.

The key acquisition information is usually the information used to acquire a secret key. The identity verification information is usually the information used to authenticate an identity.

Herein, the executive subject may randomly generate a random number for the file name, and takes the random number as the key acquisition information, and randomly generate an initial vector for the file name and takes the initial vector as the identity verification information. In practice, the executive subject may randomly generate a random number having 16 bytes and takes the random number as the key acquisition information, and randomly generate an initial vector having 12 bytes and takes the initial vector as the identity verification information.

Then, a secret key matching with the key acquisition information is obtained from a set of secret keys of the operating system according to the key acquisition information and the identity verification information, and the obtained secret key is determined as the first secret key.

Herein, when the executive subject needs to extract the secret key from the set of secret keys of the operating system, the operating system usually needs to authenticate the identity of the executive subject. Specifically, the operating system may authenticate the identity verification information, and output a secret key matching with the key acquisition information to the executive subject if the authentication is passed. In practice, if the operating system is Android operating system, the executive subject may use the key acquisition information to obtain the secret key matched with the key acquisition information from a key store used for storing secret keys in the Android operating system. If the operating system is iOS operating system, the executive subject may use the key acquisition information to obtain the key matched with the key acquisition information from a keychain used for storing secret keys in the iOS operating system.

In this implementation, the secret key is obtained from the set of keys of the operating system according to the identity verification information and the key acquisition information, the obtaining of the secret key is safer and more reliable, so that the security of the encrypted file is ensured.

At step 102, the file name is encrypted according to the first secret key to obtain file name encryption information.

The file name encryption information generally refers to the information obtained by encrypting a file name.

In this embodiment, after the first secret key is obtained, the executive subject may use the encryption algorithm and the first secret key to encrypt the file name so as to obtain an encrypted file name. In this condition, the encrypted file name is the file name encryption information. In practice, the encryption algorithm may be an advanced encryption standard (Advanced Encryption Standard, AES) encryption algorithm.

At step 103, the file to be encrypted and the file name encryption information are sent to the local service layer, in order that the local service layer encrypts the file content of the file to be encrypted based on the file to be encrypted and the file name encryption information, so as to encrypt the file to be encrypted.

Where the local service layer is a Native layer. The Native layer is characterized in that C language or C++ language is used to implement functions, an operation speed is fast, and a data processing efficiency is high.

In this embodiment, the executive subject may transmit the file to be encrypted and the file name encryption information to the Native layer. In this way, the Native layer may encrypt the file content of the file to be encrypted. As an example, the Native layer may use the file name encryption information and an encryption algorithm such as an RSA encryption algorithm, an ASE encryption algorithm, or the like to encrypt the file content of the file to be encrypted.

The RSA encryption algorithm is an asymmetric encryption algorithm. The RSA encryption algorithm is an encryption algorithm proposed by three persons of Ron Rivest, Adi Shamir and Leonnard Adleman jointly. The name of the RSA encryption algorithm is composed by splicing the beginning letters of the three persons. The RSA encryption algorithm is usually used to generate a pair of RSA keys, one of the pair of RSA keys is a private key and is stored by a user, and the other one of the pair of RSA keys is a public key, and can be open to the public. In practice, an encryption operation is usually performed using the public key, and a decryption operation is performed using the private key.

According to the method of this embodiment, the Native layer has high security and is not prone to be decompiled and cracked. Furthermore, the Java layer and the Native layer are used to encrypt the file to be encrypted, and the operation for encrypting the file content is mainly performed on the Native layer, so that the security of the encrypted file can be guaranteed. Additionally, since the universality of the codes of the Native layer is relatively higher, so that the method for file encryption can be suitable to environments of different operating systems. Thus, compared with compiling a set of applicable codes for file encryption for each of the operating systems, the Native layer is used to encrypt the file, so that the research and development cost can be saved.

In some optional implementations of this embodiment, the method for file encryption may further include the following steps: generating a pair of RSA keys; using the RSA keys to encrypt the key acquisition information; associating the encrypted key acquisition information with the identity verification information and storing the encrypted key acquisition information and the identity verification information; and associating the file name with the encrypted key acquisition information and storing the file name and the encrypted key acquisition information.

In this implementation, the executive subject may generate a pair of RSA keys, and then use the public key of the RSA keys to encrypt the key acquisition information. Then, the encrypted key acquisition information is associated with the identity verification information. Finally, the file name is associated with the encrypted key acquisition information. It should be noted that the aforesaid storing in association generally refers to associating at least two objects, and then storing the at least two associated objects. In this way, other objects associated with one object may be found through said one object. For example, if A and B are stored in association, generally, it means that A is first associated with B, and then A and B which are associated with each other are stored. In this way, another associated one such as B, may be found by one such as A.

In practice, the encrypted key acquisition information and the identity verification information are usually associated in a key-value pair manner. Moreover, the file name and the encrypted key acquisition information are associated in a key-value pair manner. In actual application, if the operating system is an Android operating system, the key-value pair is usually stored in a Shared Preference for storing simple data in the Android operating system. If the operating system is the iOS operating system, the key-value pair is usually stored in a Keychain of iOS operating system.

In this implementation, after acquiring the key acquisition information, the key acquisition information may be used to acquire the secret key matching with the key acquisition information from the set of keys of the operating system. The key acquisition information in the form of plaintext may cause the matched secret key to be prone to be acquired, and a reduction of the difficulty of cracking the encrypted file is caused. Therefore, the public key is used to encrypt the key acquisition information, so that the key acquisition information in the plaintext form can be obtained only when the private key is obtained, and thus the security of the encrypted file is further ensured.

In addition, the encrypted key acquisition information and the identity verification information are associated and stored, the file name and the encrypted key acquisition information are associated and stored, so that the file can be decrypted safely and conveniently.

In practice, a process of decrypting the encrypted file may be implemented as follows: first, the file name is used to obtain the encrypted key acquisition information. Then, the encrypted key acquisition information is used to obtain the identity verification information. Then, the private key may be used to decrypt the encrypted key acquisition information so as to obtain the key acquisition information in the form of plaintext. In this way, the key acquisition information and the identity verification information may be used to obtain the secret key matching with the key acquisition information from the set of keys. Then, the obtained secret key is used to encrypt the file name so as to obtain file name encryption information. Finally, the file name encryption information and the encrypted file are transmitted to the Native layer, in order that the Native layer decrypts the encrypted file based on the file name encryption information.

Second Embodiment

Figure 2:
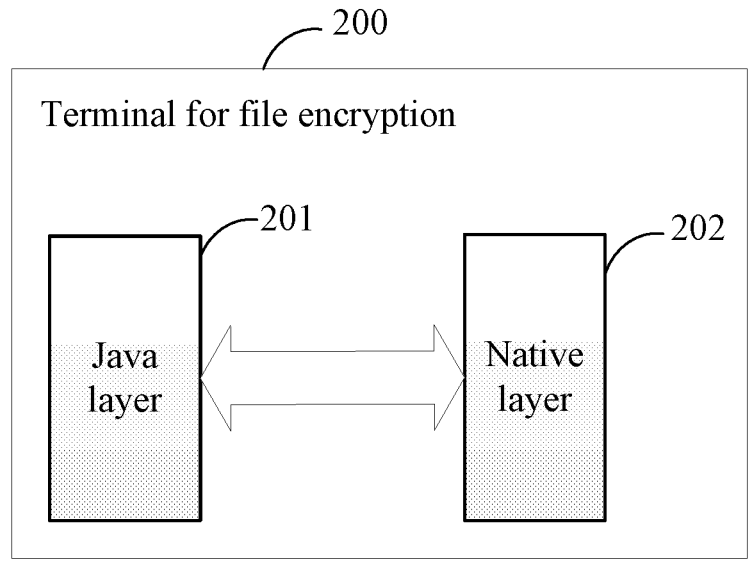
FIG. 2 illustrates a schematic structural diagram of a terminal for file encryption provided by one embodiment of the present application.

Continuing to refer to FIG. 2, FIG. 2 illustrates a schematic structural diagram of a terminal for file encryption according to one embodiment of the present application. As shown in FIG. 2, the terminal 200 for file encryption includes a Java layer 201 and a Native layer 202.

The Java layer 201 is configured to: determine, in response to obtaining a file to be encrypted, a first secret key for encrypting a file name according to a file name of the file to be encrypted; encrypt the file name according to the first secret key to obtain file name encryption information; and send the file to be encrypted and the file name encryption information to the Native layer.

The Native layer 202 is configured to encrypt a file content of the file to be encrypted based on the file to be encrypted and the file name encryption information, so as to encrypt the file to be encrypted.

In some embodiments, in the Java layer 201, said determining the first secret key for encrypting the file name according to the file name of the file to be encrypted, includes: first, generating the key acquisition information and the identity verification information according to the file name; then, acquiring a secret key matching with the key acquisition information from a set of keys of the operating system according to the key acquisition information and the identity verification information, and determining the obtained secret key as the first secret key.

In some embodiments, the Java layer 201 is further configured to: generate a pair of RSA keys; use a public key of the RSA keys to encrypt the key acquisition information; associate the encrypted key acquisition information with the identity verification information and store the encrypted key acquisition information and the identity verification information associated with the encrypted key acquisition information; and associate the file name with the encrypted key acquisition information, and storing the file name and the encrypted key acquisition information associated with the file name.

According to the terminal for file encryption disclosed in this embodiment, since the Native layer has high security and is not prone to be decompiled and cracked; furthermore, the Java layer and the Native layer are used to encrypt the file to be encrypted, and the encryption operation of the file content is mainly performed on the Native layer, so that the security of the encrypted file can be guaranteed. In addition, since the universality of the codes of the Native layer is relatively higher, so that the terminal 200 for file encryption can be suitable for environments of different operating systems. Thus, compared with compiling a set of applicable codes for file encryption for each of the operating systems, the Native layer is used to encrypt the file, so that the research and development cost can be saved.

It needs to be noted that, the contents including the information interaction between the Java layer and the Native layer and the execution process, and the method embodiment of the present disclosure are based on the same concept. Regarding the detailed implementation functions and the technical effects of the contents, reference can be made to the part of the method embodiment, the detailed implementation functions and the technical effects of the aforesaid contents are not repeatedly described herein.

In some optional implementations of this embodiment, the Native layer is further configured to send the encrypted file to the Java layer.

The encrypted file generally includes a file name and an encrypted file content.

In practice, the Native layer may send the file name and the encrypted file content to the Java layer.

The Java layer may be further configured to: obtain, in response to receiving a file reading request including the file name, the first secret key according to the file name in the file reading request; encrypt the file name according to the first secret key to obtain the file name encryption information; and send the encrypted file and the file name encryption information to the Native layer.

The file reading request may be the information of requesting to obtain information of a file indicated by the file name.

Herein, aiming at the file name, the Java layer determines the first secret key for encrypting the file name when the file is encrypted. Thus, the Java layer may associate the file name with the first secret key and store the file name and the first secret key associated with the file name. In this way, after receiving the file reading request, the Java layer may use the file name to obtain the first secret key associated with the file name directly.

In one embodiment, if the file is encrypted, the Java layer obtains the first secret key according to a method listed below: the key acquisition information and the identity verification information are generated first according to the file name. Then, according to the key acquisition information and the identity verification information, the secret key matching with the key acquisition information is obtained from the set of keys of the operating system, and the obtained secret key is determined as the first secret key. Then, the Java layer may associate the file name with the key acquisition information and the identity verification information, and store the file name, the key acquisition information and the identity verification information associated with the file name. In this way, after receiving the file reading request, the Java layer may use the file name to obtain the key acquisition information and the identity verification information associated with the file name, and thereby using the key acquisition information and the identity verification information to obtain the first secret key matching with the key acquisition information from the set of keys of the operating system.

In one embodiment, when the file is encrypted, after the Java layer obtains the first secret key according to the aforesaid method, the Java layer is further configured to perform the following steps: generating the pair of RSA keys, using the public key of the pair of RSA keys to encrypt the key acquisition information, associating the encrypted key acquisition information with the identity verification information and storing the encrypted key acquisition information and the identity verification information associated with the encrypted key acquisition information, and associating the file name with the encrypted key acquisition information, and storing the file name and the encrypted key acquisition information associated with the file name. Then, after receiving the file reading request, the Java layer may use the file name to obtain the encrypted key acquisition information associated with the file name, and use the encrypted key acquisition information to obtain the identity verification information. Then, the private key is used to decrypt the encrypted key acquisition information so as to obtain the key acquisition information in the plaintext form. Thus, the key acquisition information and the identity verification information may be used to obtain the first secret key matching with the key acquisition information from the set of keys of the operating system.

After the first secret key is obtained, the Java layer may use an encryption algorithm and the first secret key to encrypt the file name so as to obtain the encrypted file name. In this condition, the aforesaid encrypted file name is the file name encryption information. In practice, the aforesaid encryption algorithm may be an advanced encryption standard (Advanced Encryption Standard, AES) encryption algorithm.

Then, the Java layer may transmit the encrypted file and the file name encryption information to the Native layer. In this way, the Native layer may decrypt the encrypted file.

The Native layer may be further configured to decrypt the encrypted file content according to the file name encryption information to obtain a decrypted file content, and send the decrypted file to the Java layer.

The decrypted file includes a file name and the decrypted file content.

Herein, after receiving the encrypted file and the file name encryption information sent by the Java layer, the Native layer may use the file name encryption information to decrypt the encrypted file content so as to obtain the file content in the form of plaintext. In this way, the Native layer may transmit the decrypted file to the Java layer.

The decrypted file generally includes the file name and the decrypted file content.

The Java layer 201 may be further configured to output the decrypted file.

Herein, the Java layer may receive the decrypted file sent by the Native layer, and output the decrypted file. As an example, the file name and the file content of the file may be presented to the user through a screen.

In this implementation, the Native layer has high security and is not prone to be decompiled and cracked. Furthermore, the Java layer and the Native layer are used to decrypt the file to be encrypted, and the decryption operation of the file content is mainly performed on the Native layer, so that a secure decryption of the encrypted file can be guaranteed.

In some optional implementations of this embodiment, in the Native layer, said encrypting the file content of the file to be encrypted based on the file to be encrypted and the file name encryption information, includes:

First, a second secret key for encrypting file content is generated according to a preset key generation step and the file name encryption information.

The preset key generation step may be a preset step for generating the key.

The preset key generation step may be one step or a series of steps. As an example, the key generation step may be implemented as: performing an electronic codebook (Electronic Codebook, ECB) mode encryption algorithm on file name encryption information and preset data, and determining data obtained by performing the ECB mode encryption algorithm as the second secret key. The preset data may be a pre-generated 32-bit random number. The ECB mode is the most basic working mode of block cipher. In this ECB mode, the information to be processed is divided into groups with appropriate sizes, and then each group is independently encrypted or decrypted. In the ECB mode, due to the independence of each group, parallel processing of each group of information is facilitated, and error propagation can be well prevented. The ECB mode is usually used for security protection of character information of a small amount of data, such as key protection.

Then, the file content is encrypted according to a preset encryption step and the second secret key.

The preset encryption step may be a preset step for encrypting the file content. The preset encryption step may be one step or a series of steps. As an example, the preset encryption step may be implemented as: performing an encryption algorithm on the file content by using an AES encryption algorithm and the second secret key.

In this implementation, the Native layer further processes the file name encryption information to obtain the second secret key, and then uses the obtained second secret key to encrypt the file content. Compared with directly using the file name encryption information obtained from the Java layer to encrypt the file content, the security is much higher, so that the security of the encrypted file is further guaranteed.

In some optional implementations of this embodiment, the process of encrypting the file by the Native layer is implemented as: generating the second secret key for encrypting the file content according to the preset key generation step and the file name encryption information; and encrypting the file content according to the preset encryption step and the second secret key. In this condition, in the Native layer, decrypting the encrypted file content according to the file name encryption information may include:

First, the second secret key is generated according to the preset key generation step and file name encryption information.

Herein, the operation of generating the second secret key by the Native layer during the decryption process is basically the same as the operation of generating the second secret key during the encryption process, and thus is not repeatedly described herein.

Then, the file content is decrypted according to the preset decryption step and the second secret key.

The preset decryption step is usually a step corresponding to the preset encryption step. The preset decryption step may be one step or a series of steps. As an example, the preset decryption step may be implemented as: performing a decryption calculation on the file content by using the AES encryption algorithm and the second secret key.

In this implementation, when the file is encrypted by the Native layer, the file name encryption information is used to generate the second secret key, in order that the second secret key is used to encrypt the file. When the file is decrypted by the Native layer, the file name encryption information is used to generate the second secret key, in order that the second secret key is used to decrypt the file. The file content is encrypted and decrypted in a symmetric encryption manner, such that the file can be encrypted and decrypted quickly.

Third Embodiment

Figure 3:
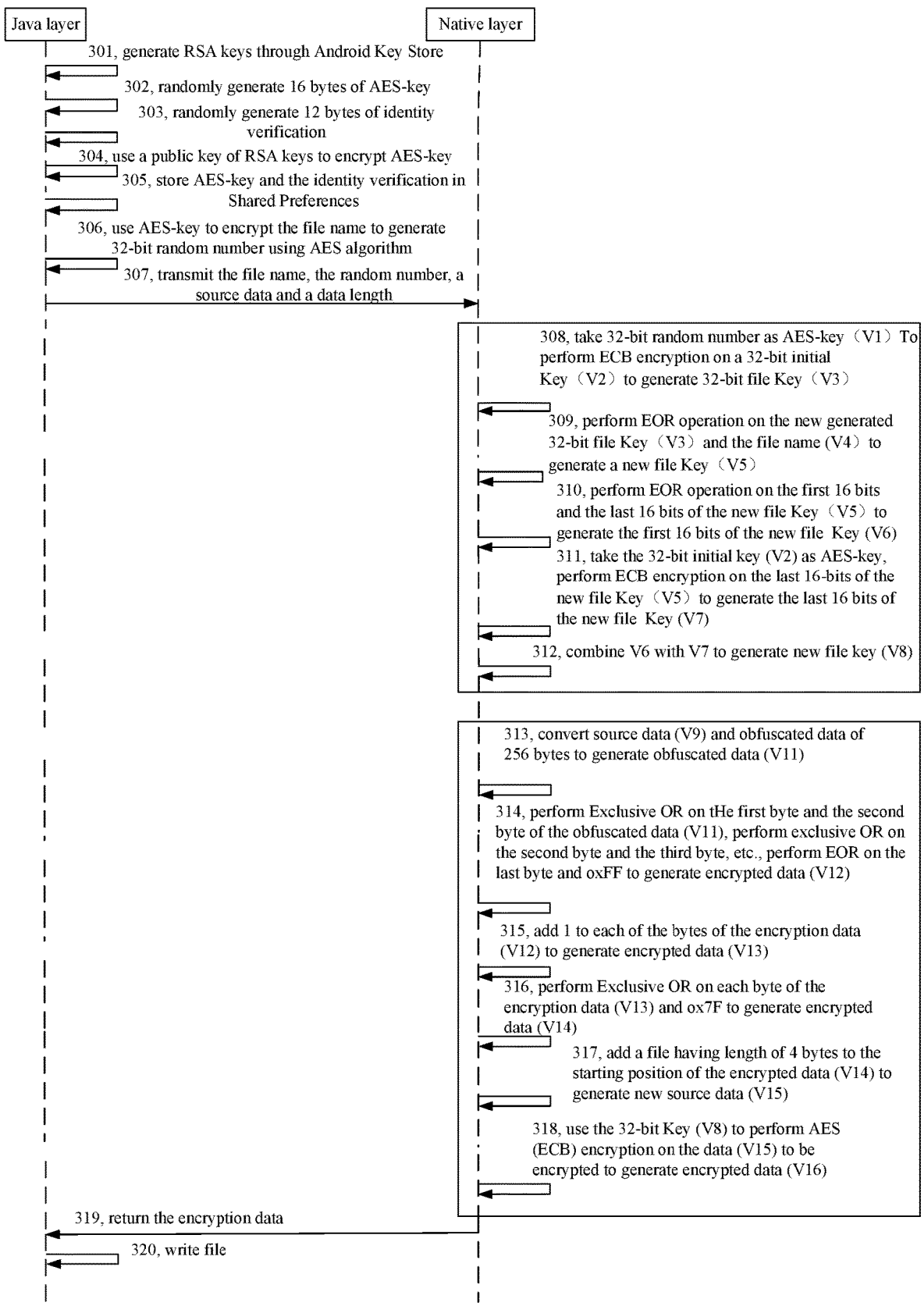
FIG. 3 illustrates a time sequence diagram of the method for file encryption provided by another embodiment of the present application.

Continuing to refer to FIG. 3, FIG. 3 illustrates a timing sequence diagram of a method for file encryption according to one embodiment of the present application.

As shown in FIG. 3, when the method for file encryption is applied to a terminal device which Android operating system is operating on, the method for file encryption may include:

At step 301, a pair of RSA keys is generated by using the Android Key Store.

Where the Android Key Store is a key store of the Android operating system used for storing secret keys. The generated pair of RSA keys includes a RSA public key and a RSA private key.

It should be noted that, if the operating system is iOS operating system, when the method for file encryption is operated on the terminal device which is installed with the iOS operating system, the step may be implemented as generating a pair of RSA keys through a key Chain of the iOS operating system.

At step 302, AES-Key having 16-bytes is randomly generated.

Herein, the AES-Key is the key acquisition information.

At step 303, identity verification (Identity Verification, IV) having 12 bytes is randomly generated.

Here, IV is the abbreviation of identity verification information. The key acquisition information and the identity verification information may be used to obtain the secret key matching with the key acquisition information from the key store of the operating system.

At step 304, the RSA public key is used to encrypt the AES-Key.

Herein, the RSA public key is used to encrypt the AES-key so as to obtain an encrypted AES-key.

It should be noted that the AES-Key is encrypted, so that a protection of the AES-Key from being stolen maliciously is facilitated.

At step 305, the AES-Key and the IV are stored in Shared Prefs.

The Shared Prefs is an abbreviation of Shared Preference. The Shared Preference is usually used to store simple data in the Android operating system, and the data stored in the shared Preference is usually stored in the form of key-value pair.

It should be noted that, if the operating system is the iOS operating system, when the method for file encryption is operated on the terminal device which is installed with the iOS operating system, the step may be implemented as: storing the AES-Key and the IV in the Key Chain.

At step 306, the AES-key is used to encrypt the file name by using the AES algorithm to generate a 32-bit random number.

The generated 32-bit random number is the file name encryption information. Herein, the Java layer uses the key acquisition information and the AES encryption algorithm to encrypt the file name so as to obtain the file name encryption information.

At step 307, the file name, the random number, a source data, and a data length are transmitted.

Herein, the source data is the file content. The random number is the generated 32-bit random number, that is, the file name encryption information. The data length is the length of the file content.

The executive subject for performing the steps 301-307 is the Java layer.

At step 308, the 32-bit random number is used as an AES-Key V1 to perform an ECB encryption algorithm on a 32-bit initial Key V2 to generate a 32-bit file Key V3.

Herein, the Native layer may use the 32-bit random number (i.e., the file name encryption information) obtained from the Java layer as the secret key for the AES encryption algorithm, which is recorded as V1. V1 is used to perform ECB mode encryption on a pre-stored 32-bit data V2 to obtain a new 32-bit data which is recorded as V3. Where the pre-stored 32-bit data may be a randomly generated 32-bit data.

At step 309, an Exclusive OR (EOR) operation is performed on the new generated 32-bit file Key V3 and a file name V4 to generate a new file Key V5.

Herein, for the convenience of description, the Native layer may record the file name as V4. The Native layer may perform an Exclusive OR operation on the aforesaid V3 and V4 to obtain V5. An operational character of the Exclusive OR operation is $\oplus$, and an operational rule of the Exclusive OR operation is expressed as $0 \oplus 0=0, 0 \oplus 1=1, 1 \oplus 0=1, 1 \oplus 1=0$.

At step 310, The Exclusive operation is performed on the first 16 bits and the last 16 bits of the new generated file Key V5 to generate a new file KEY (the first 16 bits).

Herein, the generated V5 is a 32-bit data, and the Native layer may perform the Exclusive OR operation on the first 16 bits and the last 16 bits of V5 to obtain a 16-bit data V6.

At step 311, the 32-bit initial Key V2 is used as the AES-Key to perform the ECB encryption algorithm on the last 16 bits of the new file Key V5 to generate the new file KEY (the last 16 bits).

Herein, the Native layer may use V2 as the secret key of the AES encryption algorithm, and perform the AES encryption of the ECB mode on the last 16 bits of V5, to obtain a 16-bit data V7.

At step 312, V6 and V7 are combined to generate a new file Key (V8).

Herein, the Native layer may combine the obtained 16-bit data V 6 and the 16-bit data V7 into a new data V8. Where the data V6 is the first 16 bits of the data V8, and data V7 is the last 16 bits of the data V8.

It should be noted that, the executive subject of the aforesaid steps 308-312 is the Native layer. The steps 308-312 may be taken as the preset key generation step. The Native layer may generate the second secret key for encrypting the file content by performing the aforesaid steps 308-312. V8 is taken as the aforesaid second secret key.

At step 313, the source data V9 and 256 bytes of obfuscated data V10 are converted into an obfuscated data V11.

Herein, the source data is the file content of the file to be encrypted. For the convenience of description, the source data is recorded as V9. The Native layer may first perform data obfuscation processing on the source data V9 to obtain the obfuscated data V11. In particular, the Native layer may use the pre-stored 256-bytes of the obfuscated data V10 for obfuscation to perform data obfuscation processing on the source data V9. When the data obfuscation processing is performed on the source data V9, characters in the source data V9 may be directly replaced with the corresponding characters in the obfuscated data V10. As an example, if the source data V9 is 123, a character corresponding to 1 in the obfuscated data V11 is 8, a character corresponding to 2 in the obfuscated data V11 is 4, and a character corresponding to 3 in V11 is 0, after the data obfuscation processing is performed on the source data V9, an obfuscated data 840 may be obtained.

It should be noted that since the 256 bytes of obfuscated data V10 is randomly generated by an application program, the content of the obfuscated data V10 may be periodically updated. Thus, the obfuscated data V10 is used to replace the characters included in the source data into the corresponding characters in the obfuscated data V10, such that the source data can be protected from being leaked, and the security protection of the source data is ensured.

At step 314, an Exclusive OR operation is performed on the first byte and the second byte of the obfuscated data V11, an Exclusive OR operation is performed on the second byte and the third byte of the obfuscated data V11, etc., an Exclusive OR operation is performed on the last byte and 0xFF, so that an encrypted data V12 is generated.

For example, if the obfuscated data V11 has 3 bytes, an Exclusive OR operation is performed on the first byte and the second byte of the obfuscated data to obtain a new first byte. An Exclusive OR operation is performed on the second byte and the third byte to obtain a new second byte. An Exclusive OR operation is performed on the third byte and 0xFF to obtain a new third byte. In this condition, the new first byte, the new second byte, and the new third byte may be combined to obtain the encrypted data V12.

At step 315, 1 is added to each of the bytes of the encrypted data V12 to generate an encrypted data V13.

Herein, add 1 operation is performed on each of the bytes included in the encrypted data V12.

At step 316, an Exclusive OR operation is performed on each byte of the encrypted data V14 and 0x7F to generate encrypted data V14.

Herein, Exclusive OR operation is performed on each of the bytes included in V13 and 0x7F.

At step 317, a file having a length of 4 bytes is added to a starting position of the encrypted data V14 to generate a new source data V15.

Herein, a content having 4 bytes is added on the basis of the encrypted data V14. As an example, multiple zeros having 4 bytes may be added to the starting position of the encrypted data V14.

At step 318, the 32-bit Key V8 is used to perform AES (ECB) encryption algorithm on the data V15 to be encrypted to generate encrypted data V16.

Herein, the 32-bit Key V8 obtained in the step 312 is used to encrypt V15 through the AES in the ECB mode to obtain the encrypted data V16. The encrypted data V16 is the encrypted file content.

It should be noted that, the executive subject of the aforesaid steps 313-318 is the Native layer. The steps 313-318 may be the preset encryption steps. The Native layer may encrypt the file content by performing the aforesaid steps 313-318.

At step 319, the encrypted data is returned.

The executive subject of the step 319 is the Native layer. The Native layer may push the encrypted file content to the Java layer.

At step 320, the file is written.

The executive subject of the step 320 is the Java layer. The Java layer may obtain the encrypted file content pushed by the Native layer, and store the encrypted file content.

It should be noted that, when the encrypted file is decrypted, the process of decrypting the encrypted file content by the Native layer is an inverse operation of the aforesaid steps 313-318. In this condition, the inverse operation of the steps 313-318 may be the preset decryption steps. The Native layer may decrypt the encrypted file content by performing the inverse operation of the aforesaid steps 313-318.

Fourth Embodiment

Figure 4:
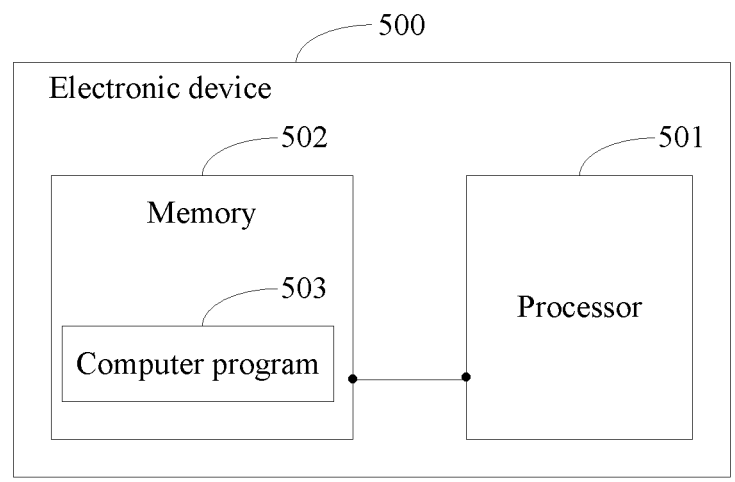
FIG. 4 illustrates a schematic structural diagram of an electronic device provided by one embodiment of the present application.

FIG. 4 illustrates a schematic structural diagram of an electronic device 500 provided by one embodiment of the present application. As shown in FIG. 4, the electronic device 500 in this embodiment includes: at least one processor (only one processor is shown in FIG. 4), a memory 502 and a computer program 503 (e.g., file encryption procedure) stored in the memory 502 and executable by the at least one processor 501. When executing the computer program 503, the processor 501 is configured to implement the steps of any one of the embodiments of the various methods for file encryption.

For example, the computer program 503 may be segmented into one or a plurality of modules/units, the one or plurality of modules/units are stored in the memory 502, and executed by the processor 501 so as to implement the present application. The one or plurality of modules/units may be a series of computer program instruction segments that can accomplish particular functionalities, these instruction segments are used for describing an executive process of the computer program 503 in the electronic device 500. For example, the computer program 503 may be segmented into the data receiving unit, the data obfuscation unit. The functionalities of the various units have been described in the aforesaid embodiments, and thus are not repeatedly described herein.

The electronic device 500 may be a computing device such as a server, a desktop computer, a tablet computer, a cloud server and a mobile terminal, etc. The electronic device 500 may include but is not limited to: the processor 501, the memory 502. A person of ordinary skill in the art can understand that, FIG. 4 is only one example of the electronic device 500, but should not be constituted as limitation to the electronic device 500. More or less components than the components shown in FIG. 4 may be included. As an alternative, some components or different components may be combined; for example, the electronic device 500 may also include an input and output device, a network access device, a bus, etc.

The so-called processor 501 may be a central processing unit (Central Processing Unit, CPU), and may also be other general purpose processor, digital signal processor (Digital Signal Processor, DSP), application specific integrated circuit (Application Specific Integrated Circuit, ASIC), field-programmable gate array (Field-Programmable Gate Array, FGPA), or some other programmable logic devices, discrete gate or transistor logic device, discrete hardware component, etc. The general purpose processor may be a microprocessor. As an alternative, the processor may also be any conventional processor, or the like.

The memory 502 may be an internal storage unit of the electronic device 500, such as a hard disk or a memory of the electronic device 500. The memory 502 may also be an external storage device of the electronic device 500, such as a plug-in hard disk, a smart media card (Smart Media Card, SMC), a secure digital (Secure Digital, SD) card, a flash card equipped on the electronic device 500. Furthermore, the memory 502 may not only include the internal storage unit of the electronic device 500 but also include the external memory of the electronic device 500. The memory 502 is configured to store the computer program, and other procedures and data needed by the electronic device 500. The memory 502 may also be configured to store data that has been output or being ready to be output temporarily.

In the aforesaid embodiments, the descriptions of the various embodiments are emphasized respectively. Regarding a part of one embodiment which has not been described or disclosed in detail, reference can be made to relevant descriptions in other embodiments.

The foregoing embodiments are only intended to explain the technical solutions of the present application, rather than limiting the technical solutions of the present application. Although the present application has been described in detail with reference to these embodiments, a person of ordinary skilled in the art should understand that, the technical solutions disclosed in the embodiments may also be amended, some technical features in the technical solutions may also be equivalently replaced. The amendments or the replacements don't cause the essence of the corresponding technical solutions to be deviated from the spirit and the scope of the technical solutions in the embodiments of the present application, and thus should all be included in the protection scope of the present application.

What is claimed is:

1. A method for file encryption implemented by an electronic device, comprising:
   determining, in response to obtaining a file to be encrypted, a first secret key for encrypting a file name of the file to be encrypted according to the file name of the file to be encrypted;
   encrypting the file name according to the first secret key to obtain file name encryption information; and
   sending the file to be encrypted and the file name encryption information to a local service layer, in order that the local service layer encrypts a file content of the file to be encrypted based on the file to be encrypted and the file name encryption information;
   wherein said determining the first secret key for encrypting the file name of the file to be encrypted according to the file name of the file to be encrypted comprises:
   generating key acquisition information and identity verification information according to the file name of the file to be encrypted; and
   obtaining a secret key matching with the key acquisition information from a set of keys of an operating system according to the key acquisition information and the identity verification information, and determining the secret key matching with the key acquisition information as the first secret key.

2. The method according to claim 1, further comprising:
   generating a pair of RSA keys, using a public key of the pair of RSA keys to encrypt the key acquisition information, associating the encrypted key acquisition information with the identity verification information, and storing the encrypted key acquisition information and the identity verification information associated with the encrypted key acquisition information, associating the file name with the encrypted key acquisition information, and storing the file name and the encrypted key acquisition information associated with the file name.

3. An electronic device, comprising a memory, a processor, and a computer program stored in the memory and executable by the processor, wherein when executing the computer program, the processor is configured to perform steps of a method for file encryption, comprising:
- determining, in response to obtaining a file to be encrypted, a first secret key for encrypting a file name of the file to be encrypted according to the file name of the file to be encrypted;
- encrypting the file name according to the first secret key to obtain file name encryption information; and
- sending the file to be encrypted and the file name encryption information to a local service layer, in order that the local service layer encrypts a file content of the file to be encrypted based on the file to be encrypted and the file name encryption information;
- wherein when executing the computer program, the processor is further configured to:
- generate key acquisition information and identity verification information according to the file name of the file to be encrypted; and
- obtain a secret key matching with the key acquisition information from a set of keys of an operating system according to the key acquisition information and the identity verification information, and determine the secret key matching with the key acquisition information as the first secret key.

4. The electronic device according to claim 3, wherein when executing the computer program, the processor is further configured to:

generate a pair of RSA keys, use a public key of the pair of RSA keys to encrypt the key acquisition information, associate the encrypted key acquisition information with the identity verification information and store the encrypted key acquisition information and the identity verification information associated with the encrypted key acquisition information, and associate the file name with the encrypted key acquisition information and store the file name and the encrypted key acquisition information associated with the file name.

* * * * *